G. E. GILMORE AND H. M. HANES.
RESILIENT WHEEL TIRE.
APPLICATION FILED NOV. 19, 1918.
1,311,163. Patented July 29, 1919.
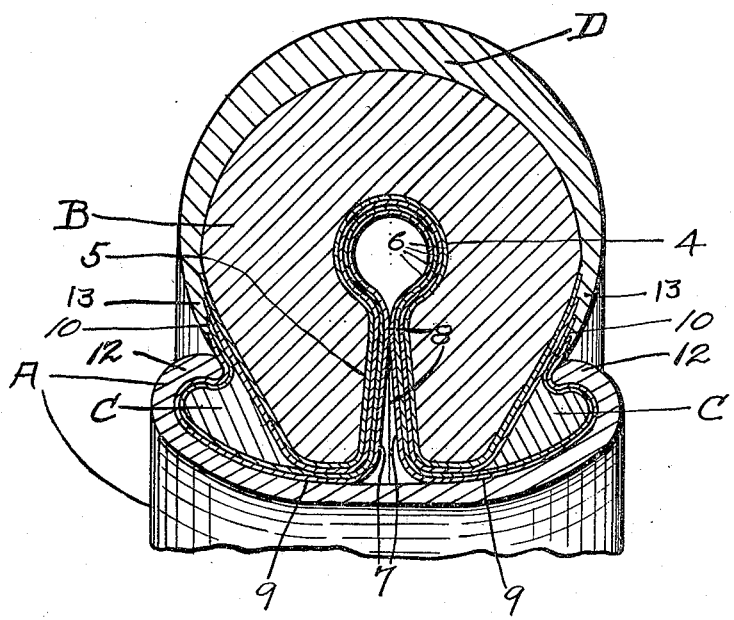
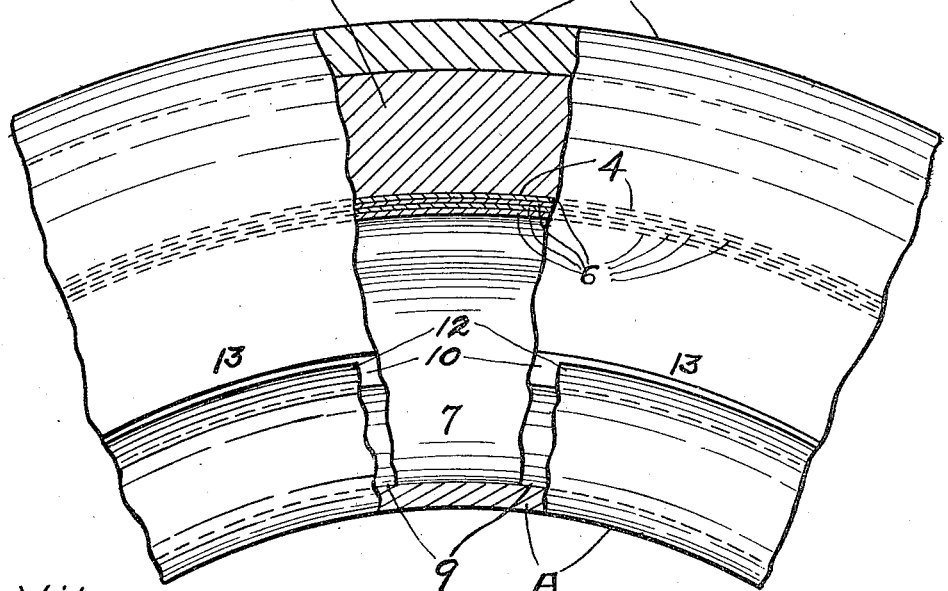

UNITED STATES PATENT OFFICE.

GEORGE E. GILMORE, OF CLEVELAND, AND HARVEY M. HANES, OF WELLINGTON, OHIO, ASSIGNORS, BY DIRECT AND MESNE ASSIGNMENTS, TO THE SECURITY TIRE & RUBBER COMPANY, OF CLEVELAND, OHIO, A CORPORATION OF OHIO.

RESILIENT WHEEL-TIRE.

1,311,163.      Specification of Letters Patent.      Patented July 29, 1919.

Application filed November 19, 1918. Serial No. 263,123.

*To all whom it may concern:*

Be it known that we, GEORGE E. GILMORE and HARVEY M. HANES, citizens of the United States, and residing, the former at Cleveland, in the county of Cuyahoga and State of Ohio, and the latter at Wellington, in the county of Lorain and State of Ohio, have invented a new and useful Resilient Wheel-Tire, of which the following is a specification.

This invention relates to improvements in resilient wheel-tires, and pertains more especially to non-inflatable and non-collapsible elastic and compressible tires well adapted for commercial delivery vehicles.

One object of this invention is to produce a resilient wheel-tire of the character indicated which can be made with facility and is remarkable for its great durability.

Another object is to produce a tire comprising an improved reinforced non-inflatable and non-collapsible resilient body having its outer half embraced by a readily renewable tread-forming envelop.

With these objects in view, this invention consists in certain peculiarities in the construction and relative arrangement and contour of the component parts of the tire, hereinafter described in this specification, pointed out in the claims, and illustrated in the accompanying drawings.

In said drawings, Figure 1 is a transverse section of a portion of our improved wheel-tire shown mounted on a wheel-rim. Fig. 2 is a side view relative to Fig. 1, but portions are broken and in section in Fig. 2 to more clearly show the construction.

In said drawings, A indicates a portion of a wheel-rim provided with a tire embodying our invention, and B indicates the body of the tire. Said body is annular and tubular and shown extending circumferentially of the wheel-rim. Said body is resilient, being composed of elastic and compressible material, such, for instance, as rubber. Said body is concentric relative to the tire and chambered interiorly, as at 4. The chamber 4 is annular and concentric relative to and arranged centrally of the body B. Said body is provided in its inner half with a slot 5 formed centrally between the sides of the tire and extending from the chamber 4 to the exterior of said body. Said slot is gradually enlarged in width toward its outer edge. The walls of the chamber 4 and slot 5 are shown thick enough to render the body B non-inflatable and non-collapsible. Preferably the outer circumferential wall of said chamber is outwardly curved in cross-section, and opposite side walls of said chamber converge toward the slot 5. Preferably the diameter of said chamber measures less than one-third of the distance between opposite sides of the body B.

The walls of the chamber 4 have a covering shown composed of four layers 6 of fibrous flexible fabric or material, such, for instance, as sea-island cotton, which is substantially or approximately non-elastic and non-stretchable. Said covering is cemented or adhesively attached to the body B in any approved manner, and adjacent layers 6 are adhesively or otherwise secured together.

Our improved tire is shown as comprising two annular beads C which are preferably composed of elastic and compressible material, such, for instance, as rubber. Said beads are concentric relative to the body B and arranged at opposite sides respectively of and spaced from the slot 5. The layers 6 extend at each side wall of said slot through the slot and form a covering 7 for said wall and extend, at the outer edge of the slot, over the adjacent external surface of the inner half of the body B, as at 9, and toward and incase the adjacent bead C and extend outwardly beyond said bead, as at 10, toward the outer circumference of the tire. Preferably the covering 7 of one side wall of the slot 5 is in contact, as at 8, adjacent the chamber 4, with the covering 7 of the other side wall of the slot. The outer of adjacent bead-incasing layers terminates externally of the inner half of the body B at a point farther from the outer circumference of the tire than the inner of said layers. By the construction and relative arrangement of the parts hereinbefore described it will be observed that the slot 5 divides the inner half of the body B into two parts, that the covering for the walls of the chamber 4 constitutes a reinforcement for said body, that each of said parts of said half of said body are embraced and reinforced by an extension of said covering, and that the bead C adjacent said extension of said covering is incased by the two intermediate layers of said extension.

Preferably said extension of said covering is adhesively attached to said body between the outer edge of the slot and the chamber 4 and between the slot and said bead and at the exterior of said body between said bead and the outer half of said body. Each bead C is, therefore, reliably secured to said body. The incased beads C are shown embraced by flanges 12 with which the wheel-rim A is provided, and preferably the slot 5 has such width at its outer edge that the coverings 7 for opposite walls of the slot are separated far enough to permit such lateral compression of the tire as is required to facilitate removal of the tire from or its application to the wheel-rim.

Our improved tire also comprises a tread-forming envelop D composed of elastic and compressible material, such, for instance, as rubber. Said envelop embraces and extends circumferentially of the outer half of the body B and is cemented or secured to said body in any approved manner. Said envelop has each side portion 13 thereof overlapping the outer side of the adjacent portion of each layer of the adjacent extension of the covering for the walls of the chamber 4 and cemented or otherwise attached to said layers. Obviously the tread-forming envelop D, when it has become unduly worn, can be readily cut away or removed and replaced by a new tread-forming envelop.

A tire having its body B contoured in cross-section as hereinbefore described and having the walls of its central chamber 4 covered and reinforced as hereinbefore described and having the covering for said walls extended so as to embrace each of the hereinbefore mentioned parts of the inner half of said body, not only has considerable resilience, but is positively non-collapsible and especially well adapted for delivery commercial vehicles.

What we claim is—

1. In a resilient tire, the combination, with an elastic and compressible body having a central chamber and a slot which is formed in the inner half of said body and arranged centrally between the sides of the tire and divides said half into two parts, and two beads at opposite sides respectively of said slot, of a flexible covering for the walls of the aforesaid chamber, said covering being secured to said body, each of the aforesaid parts of the inner half of said body being embraced by an extension of said covering, and said extension participating in the attachment of the adjacent bead to said body.

2. In a resilient tire, the combination, with an elastic and compressible body having a central chamber and a slot which is formed in the inner half of said body and arranged centrally between the sides of the tire and divides said half into two parts, and two beads at opposite sides respectively of said slot, of a flexible covering for the walls of the aforesaid chamber, said covering being secured to said body, each of the aforesaid parts of the inner half of said body being embraced by an extension of said covering, the bead adjacent said extension being embraced and held to said body by said extension, and said extension of said covering being secured to said body between the inner side of said bead and the aforesaid chamber and at the opposite side of said bead.

3. In a resilient tire, the combination, with an elastic and compressible non-inflatable body having a central chamber and a slot which is formed in the inner half of said body and arranged centrally between the sides of the tire and divides said half into two parts, and two elastic and compressible beads at opposite sides respectively of said slot, of a covering for the walls of the aforesaid chamber, said covering being secured to said body and comprising layers of flexible material, each of the aforesaid parts of the inner half of said body being embraced by an extension of said covering, the bead adjacent said extension being incased by layers of said extension, and said extension of said covering being secured to the aforesaid body between the outer edge of the aforesaid slot and the aforesaid chamber and between the inner side of said bead and said slot and at the opposite side of said bead.

4. In a resilient tire, the combination, with an elastic and compressible non-inflatable body having a central chamber and a slot which is formed in the inner half of said body and divides said half into two parts, and two beads arranged at opposite sides respectively of and spaced from said slot, of a covering for the walls of said chamber, said covering being secured to said body and comprising four layers of flexible material, each of the aforesaid parts of the inner half of said body being embraced by an extension of said covering, the bead adjacent said extension being incased by the two intermediate layers of said extension, and said extension of said covering being secured to said body between the outer edge of the slot and the aforesaid chamber and between said bead and the slot and extending beyond said bead toward the outer circumference of the tire and secured, outwardly beyond said bead, to said body.

5. In a resilient tire, the combination, with an elastic and compressible body which has a central chamber and a slot formed in the inner half of said body centrally between the sides of the tire and dividing said half into two parts, and two beads at opposite sides respectively of said slot, of a flexible covering for the walls of said chamber, said covering being secured to said body, each of the aforesaid parts of the inner half of said body being embraced by an extension of said covering, and said extension participating in the attachment of the adjacent bead to said body, and a tread-forming envelop embracing the outer half of and secured to said body and having each side portion thereof secured to the adjacent extension of the aforesaid covering.

6. In a resilient tire, the combination, with an elastic and compressible body which has a central chamber and a slot formed in the inner half of said body centrally between the sides of the tire and dividing said half into two parts, and two beads at opposite sides respectively of said slot, of a covering for the walls of said chamber, said covering being secured to said body and comprising layers of flexible material, each of the aforesaid parts of the inner half of said body being embraced by an extension of said covering, the bead adjacent said extension being incased by layers of said extension, and said extension of said covering being secured to said body between said bead and the aforesaid chamber and extending beyond said bead toward the outer circumference of the tire and secured, outwardly beyond said bead, to said body, and a tread-forming envelop embracing the outer half of and secured to said body and having each side portion thereof secured to the adjacent portions of the aforesaid bead-incasing layers.

7. In a resilient tire, the combination, with an elastic and compressible body which has a central chamber and a slot formed in the inner half of said body centrally between the sides of the tire and dividing said half into two parts, and two beads arranged at opposite sides respectively of and spaced from said slot, of a covering for the walls of said chamber, said covering being secured to said body and comprising layers of flexible material, each of the aforesaid parts of the inner half of said body being embraced by an extension of said covering, the bead adjacent said extension being incased by layers of said extension, and said extension of said covering being secured to said body between the outer edge of the aforesaid slot and the aforesaid chamber and between said bead and said slot and extending beyond said bead toward the outer circumference of the tire and secured, outwardly beyond said bead, to said body, and a tread-forming envelop embracing the outer half of and secured to said body and having each side portion thereof overlapping the outer side of and secured to the adjacent portion of the outermost layer of the aforesaid bead-incasing layers.

8. In a resilient tire, the combination, with an elastic and compressible body which has a central chamber and a slot formed in the inner half of said body centrally between the sides of the tire and dividing said half into two parts, two beads arranged at opposite sides respectively of said slot, and a covering for the walls of said chamber, said covering being secured to said body and comprising layers of flexible material, each of the aforesaid parts of the inner half of said body being embraced by an extension of said covering, the bead adjacent said extension being incased by layers of said extension, and said extension of said covering being secured to said body between said bead and the aforesaid chamber and extending beyond said bead toward the outer circumference of the tire and being secured, outwardly beyond said bead, to said body, of a tread-forming elastic and compressible envelop embracing the outer half of and secured to said body and also secured to each of the bead-incasing layers.

In testimony whereof, we sign the foregoing specification, in the presence of two witnesses.

GEORGE E. GILMORE.
HARVEY M. HANES.

Witnesses:
A. W. MASSEY,
WILLIS W. HALE.

Copies of this patent may be obtained for five cents each, by addressing the "Commissioner of Patents, Washington, D. C."